(12) United States Patent
Yamane et al.

(10) Patent No.: US 8,568,949 B2
(45) Date of Patent: Oct. 29, 2013

(54) POLYESTER RESIN FOR TONER AND TONER FOR DEVELOPING AN ELECTROSTATIC CHARGE IMAGE

(75) Inventors: Akira Yamane, Kanagawa (JP); Tetsuji Moroiwa, Kanagawa (JP); Koji Yamamoto, Kanagawa (JP)

(73) Assignee: Japan U-Pica Company Ltd., Chiyoda-Ku (JP)

( * ) Notice: Subject to any disclaimer, the term of this patent is extended or adjusted under 35 U.S.C. 154(b) by 179 days.

(21) Appl. No.: 13/003,115

(22) PCT Filed: Jun. 9, 2009

(86) PCT No.: PCT/JP2009/060533
§ 371 (c)(1),
(2), (4) Date: Feb. 7, 2011

(87) PCT Pub. No.: WO2010/004826
PCT Pub. Date: Jan. 14, 2010

(65) Prior Publication Data
US 2011/0123922 A1    May 26, 2011

(30) Foreign Application Priority Data
Jul. 11, 2008 (JP) .................................. 2008-181738

(51) Int. Cl.
*G03G 9/087* (2006.01)
(52) U.S. Cl.
USPC ...................................... 430/109.4; 530/302
(58) Field of Classification Search
USPC ....................................... 430/109.4; 528/302
See application file for complete search history.

(56) References Cited

U.S. PATENT DOCUMENTS

| 4,968,575 A | 11/1990 | Matsumura et al. |
| 2006/0084001 A1* | 4/2006 | Nakanishi et al. ......... 430/109.4 |

FOREIGN PATENT DOCUMENTS

| EP | 0 347 800 A2 | 12/1989 |
| EP | 1 580 609 A1 | 9/2005 |
| JP | 60-008850 A1 | 1/1985 |
| JP | 04-070765 A1 | 3/1992 |
| JP | 04-307557 A1 | 10/1992 |
| JP | 10-060100 A1 | 3/1998 |
| JP | 2005-062517 A1 | 3/2005 |
| JP | 2005-321491 A1 | 11/2005 |
| JP | 2007-137910 A1 | 6/2007 |
| JP | 2007-137911 A1 | 6/2007 |
| KE | 02-173760 A1 | 7/1990 |

OTHER PUBLICATIONS

Chinese Office Action, Chinese Application No. 200980127148.9, dated Apr. 5, 2012 (8 pages).
Chinese Office Action dated Sep. 25, 2012 (with English translation).

* cited by examiner

*Primary Examiner* — Mark F Huff
*Assistant Examiner* — Rachel Zhang
(74) *Attorney, Agent, or Firm* — Burr & Brown

(57) ABSTRACT

A toner for developing an electrostatic charge image which contains a polyester resin as a binder resin is provided. The toner has excellent toner properties including low temperature fixing properties, anti-blocking property and anti-offset property, etc. Also a polyester resin for a toner is provided, which is used in the above-mentioned toner. As the binder resin for toner, a polyester resin comprising (1) an aromatic dicarboxylic acid and (2) a disproportionated rosin as an acid component, and (3) a tri- or more-valent polyhydric alcohol as an alcohol component is used, wherein the molar ratio (3)/(1) of the alcohol component (3) and the acid component (1) is from 1.05 to 1.65 and the molar ratio (2)/(1) of the acid components (2) and (1) is from 0.40 to 2.60.

7 Claims, No Drawings

POLYESTER RESIN FOR TONER AND TONER FOR DEVELOPING AN ELECTROSTATIC CHARGE IMAGE

TECHNICAL FIELD

The present invention relates to a toner for developing an electrostatic charge image for developing an electrostatic charge image using a xerography, an electrostatic recording method, etc. and a polyester resin for a toner used in this toner for developing an electrostatic charge image.

BACKGROUND ART

From past, various methods are known as a xerography (electrophotography), but in order to obtain a visible image using a xerography, generally, an electrostatic latent image (electrostatic charge image) is made to form by various means on photo conductors, such as a photoconductive substance, and then after developing this electrostatic latent image with the developer containing powdery ink (toner) and if needed, transferring it on an image support, such as paper, the method for fixing with heating etc. is taken.

As a method for developing the above-mentioned electrostatic latent image, dry developing methods, such as a method for using powdery toner in which a colorant, if needed, a magnetic substance is distributed into a binder resin (a resin for a toner) with carrier particles, a method for conducting a development using magnetic toner in which a magnetic substance is distributed into a binder resin without using carrier particles, have been mainly employed.

In recent years, the improvement in speed and energy saving of a copying machine utilizing a xerography, and laser beam printer are strongly demanded, and also the toner excelled in low temperature fixing property is required. In order to improve the fixing property of a toner, generally it is needed to reduce the viscosity of the toner at the time of melting, and it is needed to enlarge an adhesion area with a fixing base material, and therefore it is effective to reduce the softening temperature (Tm) of the resin for toner which is used conventionally. However, since the glass transition temperature (Tg) of a toner will fall simultaneously if Tm is generally lowered, it is known that the toner is liable to form agglomeration during storage, so-called toner blocking, or cause the offset phenomenon of the toner upon fixing, this is one of the reason why the fixing temperature cannot be decreased as desired.

As a method for satisfying simultaneously this low temperature fixing property and an anti-blocking or anti-offset property, there has been proposed a polyester-based resin utilizing a rosin-based compound, for example, a non-linear, cross-linked polyester resin wherein as an alcohol component, a bivalent alcohol is used and as acid components, rosin, unsaturated dicarboxylic acid and other dicarboxylic acid are comprised (See PTL 1), a polyester wherein an alcohol component and an acid component comprising a refined rosin are polycondensed (See PTL 2), a polyester wherein a specific alcohol component and a carboxylic acid component comprising a refined rosin are polycondensed (See PTL 3), etc. are reported.

CITATION LIST

Patent Literature

[PTL 1] JP4070765A
[PTL 2] JP2007137910A
[PTL 3] JP2007137911A

SUMMARY OF INVENTION

Technical Problem

According to the present inventor's research, it was found that although a rosin-based compound was effective in the improvement of low temperature fixing property, due to the recent improvement in speed and energy saving of a copying machine and laser beam printer, in order for the shortening of fixing time in a fixing process and the temperature decreasing of heating temperature supplied from fixing device, the conventional polyester resin for toner is not sufficient for the demands of the marketplace.

Although the trial had been made in which the toner with the good characteristic for electrostatic charge image development is manufactured using polyester resin as binder resin of a toner from past, the development of the polyester resin for toner has been desired in which the properties, such as low temperature fixing property, anti-blocking property, anti-offset property and the like are further improved.

With the view of such a situation, the purpose of the present invention is to provide a polyester resin for toner and the toner for developing an electrostatic charge image in which the toner properties, such as low temperature fixing property, anti-blocking property, anti-offset property and the like are further improved.

Solution to Problem

The present inventors completed this invention, as a result of wholeheartedly repeated research for solving the aforementioned problems.

That is, the summary of this invention is as follows.
1. A polyester resin for toner comprising an acid component and an alcohol component, characterized in that the acid component comprises (1) an aromatic dicarboxylic acid and (2) a disproportionated rosin, and the alcohol component comprises (3) a tri- or more-valent polyhydric alcohol, the molar ratio (3)/(1) of the alcohol component (3) and the acid component (1) being from 1.05 to 1.65 and the molar ratio (2)/(1) of the acid components (2) and (1) being from 0.40 to 2.60.
2. A polyester resin for toner according to any one of the above and following, characterized in that the aromatic dicarboxylic acid component uses at least one component selected from the group consisting of terephthalic acid and isophthalic acid.
3. A polyester resin for toner according to any one of the above and following, characterized in that a tri- or more-valent polyhydric alcohol component uses at least one component selected from the group consisting of trimethylolethane, trimethylolpropane, glycerin and pentaerythritol.
4. A polyester resin for toner according to any one of the above and following, characterized in that the resin comprises further an aliphatic polycarboxylic acid as an acid component.
5. A polyester resin for toner according to any one of the above and following, characterized in that the resin comprising further at least one component selected from the group consisting of aliphatic diol and etherified diphenol as an alcohol component.
6. A polyester resin for toner according to any one of the above and following, characterized in that the resin has an acid value of from 5 to 50 mgKOH/g, a softening temperature of from 105 to 150° C., a glass transition temperature of from 45 to 80° C.

7. A toner for developing an electrostatic charge image, comprising a polyester resin for toner according to any one of the above and following.

Advantageous Effects of Invention

According to the present invention, even if the fixing time in a fixing process is shortened and the heating temperature supplied from fixing device is decreased, such as the recent improvement in speed and energy saving of a copying machine and laser beam printer, an excellent polyester resin for toner and the toner for developing an electrostatic charge image can be provided in which the toner properties, such as low temperature fixing property, anti-blocking property, anti-offset property and the like can be sufficiently satisfied.

DESCRIPTION OF EMBODIMENTS

The present invention has achieved the purpose of exerting the performances excellent for the toner properties in polyester resin, in which the performances of an aromatic dicarboxylic acid and a disproportionated rosin as an acid component, and a tri- or more-valent polyhydric alcohol as an alcohol component are utilized in the maximum efficiently without spoiling the ease of handling and the productivity.

Hereafter, the invention is further described in detail. First, in the invention, the polyester resin for toner has the major characteristics at the point which the resin comprises (a) as an acid component, (1) an aromatic dicarboxylic acid and (2) a disproportionated rosin, and (b) as an alcohol component, (3) a tri- or more-valent polyhydric alcohol. Specifically, the polyester resin has a polyol structure with a branching obtained by reacting (1) an aromatic dicarboxylic acid with (3) a tri- or more-valent polyhydric alcohol and the polyester resin is obtained by reacting (2) the carboxyl group of a disproportionated rosin to the hydroxyl group of the polyol.

In the invention, for an aromatic dicarboxylic acid used as an acid component of (a), phthalic acid, terephthalic acid, isophthalic acid, biphenyl dicarboxylic acid, naphthalene dicarboxylic acid, 5-tert-butyl-1,3-benzenedicarboxylate and acid anhydrides thereof, and the derivatives, such as lower alkyl ester, etc. are mentioned.

It is especially preferred to use at least one compound selected from the group consisting of terephthalic acid, isophthalic acid, and the derivatives thereof among these. As the terephthalic acid and isophthalic acid, those lower alkyl ester may be used, and as an example of the lower alkyl ester of terephthalic acid and isophthalic acid, for example, although there are dimethyl terephthalate, dimethyl isophthalate, diethyl terephthalate, diethyl isophthalate, dibutyl terephthalate, and dibutyl isophthalate, etc., it can be said that the dimethyl terephthalate and dimethyl isophthalate are preferred due to the point of cost and treatment (handling). These dicarboxylic acid or its lower alkyl ester may be used independently, or two or more kinds may be used together. Since the terephthalic acid and isophthalic acid have an aromatic ring, Tm and Tg of resin can be adjusted to the range suitable as resin for toners, and anti-offset property and anti-blocking property become good, and they can give moderate intensity to the resin.

On the other hand, the disproportionated rosin used as an acid component of (a) could be obtained by any process conventionally known in rosin.

Rosin is a natural resin obtained from pines, and the main ingredients are resin acid, such as abietic acid, palustric acid, neoabietic acid, pimaric acid, dehydroabietic acid, isopimaric acid, sandaracopimaric acid, etc. and the mixtures thereof.

Rosin is classified broadly into the tall rosin obtained from the crude tall oil that is obtainable as by-products at the process of manufacturing pulp, the gum rosin obtained from the raw pine tar, the wood rosin obtained from the stump of a pine, etc.

The disproportionated rosin is a mixture of dehydroabietic acid and dihydroabietic acid as the main ingredients in which by heating the rosin containing abietic acid as the main ingredients at high temperature under existence of a precious metal catalyst or a halogen catalyst, the unstable conjugate double bond is vanished within a molecular. As an ingredient of the disproportionated rosin used by the invention, dehydroabietic acid of 45 weight % or more is preferably contained, and especially, 50 weight % or more is preferably contained. Disproportionated rosin is a multi-condensed ring-like monocarboxylic acid with a hydrophenanthrene ring, and there is little decline in Tg due to high-bulk (bulky) and rigid skeleton, and the anti-blocking property becomes good. Further, since it is monocarboxylic acid, the molecular weight distribution of the obtained resin can be made broader, and especially, since the resin which spreads greatly in the lower molecular weight side is obtained, the low temperature fixing property (fixability) of a toner can be improved remarkably. The effect that the grindability is improved at the time of toner production is expected by introducing disproportionated rosin as an essential ingredient of polyester. The acid value of disproportionated rosin has preferably 100 to 200 mgKOH/g, more preferably 130 to 180 mgKOH/g, and still more preferably 150 to 180 mgKOH/g. The molar ratio of (2) disproportionated rosin and (1) aromatic dicarboxylic acid is preferably (2)/(1)=0.40 to 2.60. When the molar ratio of (2) disproportionation rosin and (1) aromatic dicarboxylic acid is lower than 0.40, Tg is extremely decreased and there is a tendency for the anti-blocking property of a toner to worsen, and when exceeding 2.60, Tm becomes high too much, and the tendency for low temperature fixing property to fall comes out. More preferably, it is (2)/(1)=0.80 to 2.20.

In the invention, for a tri- or more-valent polyhydric alcohol to be used as an alcohol component of (b), at least one component selected from the group consisting of trimethylolethane, trimethylolpropane, glycerin, and pentaerythritol can be used. A tri- or more-valent polyhydric alcohol reacts with the aromatic dicarboxylic acid used as an acid component of (a) in the invention, and forms the polyol structure having moderate branching. By giving moderate branching structure to polyester resin, while maintaining low temperature fixing property without raising Tm of resin too much, the broader molecular weight distribution can be acquired to the higher molecular weight amount side, and anti-offset property becomes good. The molar ratio of (3) a tri- or more-valent polyhydric alcohol and (1) aromatic dicarboxylic acid is preferably (3)/(1)=1.05 to 1.65. When the molar ratio (3)/(1) is lower than 1.05, the molecular weight distribution becomes too broad in the side of high molecular weight and Tm becomes high, and then the low temperature fixing property falls, or it becomes impossible to control the breadth of molecular weight distribution to the side of high molecular weight, and it has become easy to cause a gelation. In addition, exceeding 1.65, there is a tendency to become a polyester resin with little branching, as a result, Tm and Tg are fallen and the anti-blocking property is fallen.

In the invention, an aliphatic polycarboxylic acid can be further used as an acid component of (a). As an aliphatic polycarboxylic acid, there are alkyl dicarboxylic acid class, such as succinic acid, adipic acid, sebacic acid, azelaic acid, etc.; succinic acid replaced by alkyl group of carbon numbers 16 to 18; unsaturated dicarboxylic acid class, such as fumaric acid, maleic acid, citraconic acid, itaconic acid, glutaconic acid, etc.; dimer acid etc. Dimer acid comprises a polymerized dicarboxylic acid as the main ingredient which is produced by polymerizing unsaturated fatty acid, and as a method for manufacturing this, although it is common to pressurize and heat unsaturated fatty acid, such as soybean oil fatty acid containing much linolic acid and/or tall oil fatty acid under existence of a small amount of water, and to make isomerization and a Diels-Alder reaction cause, and instead of this, it is possible to synthesis even if the Lewes acid type catalyst, clay stabled with lithium, a peroxide catalyzer, etc. The dimer acid obtained here is a mixture which contains a monomer and a trimer besides the dimer which is the main ingredient, and it is properly possible to use selectively the mixture from which the mixing ratio differs according to the purpose of use. By using in a proper quantity, these aliphatic polycarboxylic acids contribute to the improvement in low temperature fixing property of a toner, greatly. However, when it uses so much, since the significant drop of Tg is seen and the anti-blocking property is greatly affected, the required performance of a toner is taken into consideration and it is used in a proper quantity. The quantity of aliphatic polycarboxylic acid may be preferably 0.5 to 15 mols, more preferably 1 to 13 mols based on 100 mols of the acid component (1).

In this invention, other than the aromatic dicarboxylic acid, disproportionated rosin, and aliphatic polycarboxylic acid, as an acid component of (a), a tri- or more-valent aromatic polycarboxylic acids can be further used within the range of not spoiling the effects of the invention. As tri- or more-valent aromatic polycarboxylic acids, there are trimellitic acid, pyromellitic acid, naphthalenetricarboxylic acid, benzophenonetetracarboxylic acid, biphenyltetracarboxylic acid and/or anhydrides thereof, etc., and these may be used independently or in combination of two or more thereof. As tri- or more-valent aromatic polycarboxylic acids, from the viewpoint of a reactivity, trimellitic anhydride is preferred. As the quantity of the tri- or more-valent aromatic polycarboxylic acids, 0.1 to 5 mols are preferable, 0.5 to 3 mols are more preferably to 100 mols of an acid component (1).

Further, at least one component selected from the group consisting of aliphatic diol and etherificated diphenol can be additionally used as an alcohol component of (b) in this invention. As an example of aliphatic diol, for example, there are ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexandiol, 2,4-dimethyl-1,5-pentanediol, 2,2,4-trimethyl-1,3-pentanediol, 1,7-heptane diol, 1,8-octanediol, 1,9-nonanediol, 1,10-deccan diol, 3-hydroxy-2,2-dimethylpropyl-3-hydroxy-2,2-dimethyl propanoate, diethylene glycol, triethylene glycol, dipropylene glycol, etc. As an aliphatic diol, from the viewpoint of the reactivity with acid and the glass transition temperature of resin, ethylene glycol, 1,3-propanediol, and neopentyl glycol are preferred. These aliphatic diols may be used independently or in combination of two or more thereof. In the invention, an etherificated diphenol may be further used with aliphatic diol. Etherificated diphenol is a diol produced by carrying out an addition reaction of bisphenol A and alkylene oxide, and as the alkylene oxide, there are ethyleneoxide and/or propylene oxide and the number of average addition mols of this alkylene oxide is preferably 2 to 16 mols, per 1 mol of bisphenol A. As the quantity of aliphatic diol, 5 to 20 mols are preferred to 100 mols of an acid component (1). As the quantity of etherificated diphenol, 5 to 35 mols are preferred to 100 mols of an acid component (1).

Polyester resin for toner of the invention is prepared by using said predetermined acid component and an alcohol component as a raw material in the publicly known and commonly used method for manufacturing, and as the reaction method, either an ester exchange reaction or a direct esterification reaction can be applied. A polycondensation can also be promoted by the method of pressurizing and making reaction temperature high, the decompression procedure, or the method of passing inactive gas under ordinary pressure. In the above-mentioned reaction, the publicly known and commonly used reaction catalyst, such as at least one of metallic compounds selected from antimony, titanium, tin, zinc, aluminum, and manganese, may be used, and the reaction may be promoted. The additive amount of these reaction catalysts is preferably 0.01 to 1.0 parts by weight, per the total amount 100 parts by weight of an acid component and an alcohol component.

In the method for manufacturing polyester resin of the invention for toner, the direct esterification process can be also adopted among the above-mentioned various reactions even under ordinary pressure. In this direct esterification process, for example, the whole quantity of the alcohol component is charged at the start of the reaction, and after rising the temperature to about 160° C., and then the acid component is charged. It is preferable that at least one of metallic compounds etc. which is selected from the group consisting of antimony, titanium, tin, zinc, aluminum, and manganese is used, and the additive amount is more preferably 0.05 to 0.5 parts by weight per total amount of 100 parts by weight of the acid component and alcohol component. In this case, a sufficient reaction rate can be also obtained even the ordinary pressure, but the pressurization operation may be applied to enhance the reaction temperature. Acceleration of the reaction by the procedure of reducing the pressure is applied, for example, in the final stage of the reaction where unreacted alcohol scarcely remains and removal of generated water out of the reaction system becomes slow. Acceleration of the reaction by introducing an inert gas may be applicable at any stage of the reaction in a degree of minimizing removal of the alcohol out of the system due to the introduction of the inert gas. Also, the reaction is discontinued when the softening point of the resin reached a predetermined temperature.

As the polyester resin of the invention for a toner which consists of the above constitutions, it is desirable that preferably, the acid value is 5 to 50 mgKOH/g, more preferably 10 to 45 mgKOH/g, the softening temperature is 105 to 150° C., more preferably 110 to 145° C. and the number average molecular weight is 1,000 to 6,000, more preferably 1,500 to 4,000 by measuring in gel permeation chromatography (GPC). Because, when the softening temperature is less than 105° C., there results an extremely reduced cohesive force of the resin whereas, when it exceeds 150° C., there is a tendency for the resin to provide a toner having a reduced melt flowability and a reduced low temperature fixing property, thus such resin may have a potential to be unsuited as a binder resin of a toner for a high-speed copying machine. Also, in case where the acid value is less than 5 mgKOH/g, the resulting toner has such a small negative chargeability that the toner gives a reduced image density whereas, in case where the acid value exceeds 50 mgKOH/g, the resulting toner has such an overlarge negative chargeability that fog is formed particularly in a low humid environment and, since hydrophilicity becomes high, there may result a decreased image density particularly in a highly humid environment. As the number average molecular weight of the polyester resin decreases, anti-offset property of the toner tends to be decreased whereas, as the number average molecular weight of the polyester resin increases, fixing property of the toner tends to be decreased. Also, the polyester resin may be of a kind (type) having a molecular weight distribution curve with two peaks corresponding to a polycondensate component having a specific low molecular weight and a polycondensate component having a specific high molecular weight, respectively or of a type having a one-peak mono-molecular weight distribution curve. Moreover, preferably, the glass transition temperature (Tg) of the polyester resin of the invention for a toner has measured by a differential scanning calorimeter (DSC), the glass transition temperature is 45 to 80° C., desirably from 50 to 75° C. When Tg is less than 45° C., the anti-blocking property is decrease and the agglomeration is occurred in the toner. Further, when Tg exceeds 80° C., the low temperature fixing property may be decreased and this is undesirable.

The toner of the invention for developing an electrostatic charge image can contain the above-mentioned polyester resin as a binder resin of the essential component and further, as needed, a colorant, a charge control agent, etc. are properly combined. As the binder resin for the toner of the invention for developing an electrostatic charge image, the above-mentioned polyester resins may be used independently or in combination of two or more thereof. Further, those resins which have conventionally been used as binder resins for a toner, such as polystyrene polymers, polystyrene-based copolymers such as styrene-acryl based resin or the like, and the polyester resins, etc. other than the above-described polyester resins may be used together with the above-mentioned polyester resins within the range wherein the objects of the invention can be attained.

In the toner of this invention for developing an electrostatic charge image, if needed, a positive or negative charge control agent may be added. As a representative example of a charge control agent, in the black toner, there are a nigrosine for positively triboelectric charging toners and a mono azo dye metal salt, etc. for a negatively triboelectric charging toners. In the full color toner, there are quaternary ammonium salts, imidazole metal complexes for positively triboelectric charging toners, and salicylic acid metal complexes, organic boron salts, etc. for negatively triboelectric charging toners. These charge control agents should just be used in a proper quantity according to the kind of charge control agent, for example, if they are the above-mentioned salicylic acid metal complexes, they will usually be used in the quantity of about 0.1 to 10 parts by weight to 100 parts by weight of the binder resin.

In the toner of this invention for developing an electrostatic charge image, each colorant that is conventionally known is usable. As an example of these colorant, there are carbon black, aniline black, acetylene black, iron black, etc. as a colorant for black, and various compounds of dyes and pigments, such as phthalocyanine series, rhodamine series, quinacridone series, triallylmethane series, anthraquinone series, azo series, diazo series, methine series, allylamide series, thioindigo series, naphthol series, isoindolinone series, diketopyrropyrrole series, benzimidazolone series, etc. and the metal complex compounds, lake compounds thereof, etc. as colorant for colors. These may be used independently or by mixing two or more thereof.

In the toner of this invention for developing an electrostatic charge image, a release agent may be added. As such release agent, there are synthetic waxes, such as low molecular weight polypropylene, polyethylene, etc., and natural waxes, such as paraffin wax, carnauba wax, rice wax, montan wax, and beeswax, etc.

Also, the toner of the invention for developing an electrostatic charge image may contain, as needed, magnetic powder to form a magnetic toner. As the magnetic powder to be internally contained in the toner, any of those powders which have been conventionally used for producing magnetic toners such as alloys, oxides or compounds containing ferromagnetic elements may be used. Examples of these magnetic powders include powders of magnetic iron oxides such as magnetite, maghemite and ferrite, etc. or powders of compounds between a divalent metal and iron oxide, powders of metals such as iron, cobalt and nickel, powders of alloys between these metals and a metal such as aluminum, cobalt, copper, lead, magnesium, tin, zinc, antimony, beryllium, bismuth, cadmium, calcium, manganese, selenium, titanium, tungsten, vanadium, and a mixture of these powders. These magnetic powders have an average particle size of preferably from 0.05 to 2.0 µm, more preferably from about 0.1 to about 0.5 µm. Also, the content of the magnetic powder in the toner is preferably from about 5 to about 200 parts by weight, more preferably from 10 to 150 parts by weight, per 100 parts by weight of the thermoplastic resin. In the toner of the invention for developing an electrostatic charge image, the magnetic powder also functions as a colorant and, in the case of using the magnetic powder, other colorant may not be used. However, carbon black, copper phthalocyanine or iron black may also be used, as needed.

The external additive aiming at a fluidity improving, etc. may be added by the toner of the invention for developing an electrostatic charge image. As an example of these external additives, there are particles of inorganic compound, such as silica, alumina, titania, etc., particles of fluororesin, such as polyvinylidene fluoride, polytetrafluoroethylene, etc., particles of acrylic resins manufactured by the emulsion polymerization, and styrene-acrylic resins.

In the invention, as for the aforementioned particles of inorganic compound, such as silica, alumina, and titania, etc., it is preferred to subject these to a hydrophobicity-imparting treatment for use. As a hydrophobicity-imparting treatment of these particles, there are treatments by silane coupling agent, such as silicone oil and/or tetramethyldisilazane, dimethyldichlorosilane, dimethyldimethoxysilane, etc. The used amount of the hydrophobized particles, such as silica subjected to the hydrophobicity-imparting treatment, is preferably 0.01 to 20 weight %, more preferably 0.03 to 5 weight % per the developer weight.

It is preferable that a weight-average particle size of the toner particles in the toner of the invention for developing an electrostatic charge image is from 3 to 15 µm, and from the viewpoint of developing performance, it is more preferable that the weight average particle size of a toner is 4 to 11 µm. Furthermore, the particle size distribution measurement of the toner can be performed using, for example, Coulter counter.

The toner particle which constitutes the toner of this invention for developing an electrostatic charge image can be manufactured using the manufacturing method known publicly heretofore of toner particles. In general, there is illustrated, as a preferred process, a process which comprises sufficiently pre-mixing the binder resin, charge control agent, colorant, and the like which constitute the toner particles in a mixer such as a dry blender, a ball mill or a Henschel mixer, well kneading the mixture using a heat kneader such as a heat roller, a kneader or a uniaxial or biaxial extruder and, after cooling to solidify the mixture, mechanically rough crushing the solid mixture to using a crusher such as a hammer mill, finely pulverizing in a jet mill or the like, and classifying the resulting powder. The thus-classified toner particles are well mixed, if necessary, with an external additive using a mixer such as a Henschel mixer to prepare a toner of the invention for developing an electrostatic charge image.

The toner of the invention for developing an electrostatic charge image can be used as a two-component developer by mixing with carrier (particles). As the carrier to be used together with the toner of the invention, any of carriers known publicly heretofore can be used. As the usable carrier, for example, there are magnetic powders such as iron powder, ferrite powder, nickel powder and/or glass beads, etc. These carrier particles may have been subjected, as needed, to the treatment for covering the surface thereof with a resin or the like. As the resin for covering the surface of the carrier, there are a styrene-acrylate ester copolymer, a styrene-methacrylate ester copolymer, an acrylate ester copolymer, a methacrylate ester copolymer, a fluorine-containing resin, a silicon-containing resin, a polyamide resin, an ionomer resin, a polyphenylene sulfide resin, and a mixture of these polymers. Among these, a fluorine-containing resin and a silicon-containing resin are particularly preferred since spent toner is formed in a less amount.

The toner of the invention for developing an electrostatic charge image can be applied to any developing method or any developing apparatus for developing an electrostatic charge image formed by the electrophotography, electrostatic recording or electrostatic printing method, etc. known publicly heretofore. Also, the toner of the invention for developing an electrostatic charge image has such an excellent low temperature fixing property and anti-offset property that it can be favorably used in an image-forming method employing the system of heat-fixing a toner by means of a fixing device comprising a heating roller having an included heater therein and a pressure-applying roller pressure-contacted with the heating roller or the system of heat-fixing a toner by means of a fixing device wherein a heater is press-contacted with a pressure-applying roller via a fixing belt, which systems have been frequently employed in a small-sized electrophotographic copying machine or a printer utilizing the electrophotographic system.

EXAMPLES

Hereafter, the invention is described concretely by reference to examples which, however, do not limit the invention in any way. Furthermore, in the following description, all of the number of parts means parts by weight.

The acid value, glass transition temperature (Tg), softening temperature (Tm) used in the following working examples and comparative examples are as defined below.

(Acid Value)

Acid value says the number of milligrams of a potassium hydroxide required in order to neutralize the acid group contained in the sample 1 g.

(Glass Transition Temperature)

Glass transition temperature means a temperature at which an extended line of a base line under Tg measured by means of a differential scanning calorimeter (DSC-6220; made by SII NanoTechnology Inc.) at a temperature-raising rate of 20° C./min and a tangential line of an endothermic curve in the vicinity of Tg cross.

(Softening Temperature)

The softening temperature means a temperature when descending degree of a plunger of a flow tester is 4 mm, with the descending degree being measured on 1 g of a sample under the measuring conditions of 30 kg in load, 1 mm in nozzle diameter, 10 mm in nozzle length, 80° C. and 5 minutes in preheating temperature and period and 3° C./min in rate of temperature increase, using an elevated flow tester (CFT-500D; made by Shimadzu Seisakusho).

Example 1

Glycerin of 288 g as a raw material of alcohol component for polyester resin, isophthalic acid of 334 g and disproportionated rosin (acid value 157.2 mgKOH/g) of 1528 g as a raw material of acid component, and tetra-n-butyl titanate of 1.72 g (0.080 parts by weight to the total amount 100 parts by weight of acid component and alcohol component) as a reaction catalyst were charged into a stainless steel-made reaction vessel equipped with an agitating device, a heating apparatus, a thermometer, a fractionally distilling equipment, and a pipe for introducing a nitrogen gas, and while agitating them under a nitrogen atmosphere, polycondensation reaction was carried out at 250° C. for 10 hours, and when the softening temperature measured by the flow tester was confirmed to reach the predetermined level, the reaction was discontinued. The characteristic properties of the obtained polyester resin A are shown in Table 1.

Examples 2 to 5

Polyester resins B, C, D, E were created in the same manner as in Example 1 except for changing the compounding proportions as shown in Table 1. The characteristic properties of the obtained polyester resins are shown in Table 1.

TABLE 1

| | | Examples | | | | |
|---|---|---|---|---|---|---|
| | | 1 | 2 | 3 | 4 | 5 |
| Polyester resin | | A | B | C | D | E |
| Acid Component (g(mol)) | (1)Terephthalic acid | — | 84(20) | — | — | 225(50) |
| | (1)Isophthalic acid | 334(100) | 335(80) | 534(100) | 489(100) | 225(50) |
| | (2)Disproportionated rosin | 1528(213) | 1414(151) | 1180(103) | 914(87) | 1353(140) |
| | Dimer acid | — | — | 112(6) | 147(9) | — |
| Alcohol Component (g(mol)) | (3)Glycerin | 288(156) | 331(139) | 354(120) | 293(108) | 332(133) |
| | BPA-PO2 molar adduct | — | — | — | 318(30) | — |
| | 1,3-Propanediol | — | — | — | — | 31(15) |
| Characteristic Value | Acid value[mgKOH/g] | 11 | 15 | 17 | 12 | 10 |
| | Softening temperature[° C.] | 111 | 126 | 129 | 118 | 124 |

TABLE 1-continued

|  | Polyester resin | Examples | | | | |
|---|---|---|---|---|---|---|
|  |  | 1<br>A | 2<br>B | 3<br>C | 4<br>D | 5<br>E |
|  | Glass transition temperature[° C.] | 51 | 65 | 60 | 59 | 65 |
| Molar Ratio | (3)/(1)1.05-1.65 | 1.56 | 1.39 | 1.20 | 1.08 | 1.33 |
|  | (2)/(1)0.40-2.60 | 2.13 | 1.51 | 1.03 | 0.87 | 1.40 |

In Table, "BPA-PO2 molar adduct" means an adduct of 2 mols of ethylene oxide to bisphenol A.

Comparative Examples 1 to 6

Polyester resins F, G, H, I, J, K were made in the same manner as in Example 1 except for changing the compounding proportions as shown in Table 2. The characteristic properties of the obtained polyester resins are shown in Table 2.

TABLE 2

|  | Polyester resin | Comparative Examples | | | | | |
|---|---|---|---|---|---|---|---|
|  |  | 1<br>F | 2<br>G | 3<br>H | 4<br>I | 5<br>J | 6<br>K |
| Acid Component (g(mol)) | (1)Terephthalic acid | — | — | — | 278(100) | 483(100) | 327(50) |
|  | (1)Isophthalic acid | 610(100) | 305(100) | 937(100) | — | — | 327(50) |
|  | (2)Disproportionated rosin | 1113(85) | 1511(230) | 604(30) | 1614(270) | 547(53) | — |
|  | Dimer acid | 128(6) | — | — | — | — | — |
| Alcohol Component (g(mol)) | (3)Glycerin | 345(102) | 298(176) | 693(133) | 249(161) | — | — |
|  | BPA-PO2 molar adduct | — | — | — | — | 1047(100) | 1488(105) |
|  | 1,3-Propanediol | — | 28(20) | — | — | 55(25) | — |
| Characteristic Value | Acid value[mgKOH/g] | 28 | 10 | 15 | 12 | 33 | 10 |
|  | Softening temperature[° C.] | 153 | 99 | 102 | 155 | 140 | 133 |
|  | Glass transition temperature[° C.] | 81 | 40 | 38 | 85 | 63 | 62 |
| Molar Ratio | (3)/(1)1.05-1.65 | 1.02 | 1.76 | 1.33 | 1.61 | — | — |
|  | (2)/(1)0.40-2.60 | 0.85 | 2.30 | 0.30 | 2.70 | 0.53 | — |

In Table, "BPA-PO2 molar adduct" means an adduct of 2 mols of ethylene oxide to bisphenol A.

Example 6

Polyester resin A of Example 1 was used, and the materials shown in Table 3 were uniformly mixed, then kneaded, ground, and classified to obtain negatively chargeable toner particle with 7.4 μm in a mean particle size. Subsequently, 1.0 part of fine powder of silica treated by dimethyldichlorosilane was added to 100 parts of this toner particle, followed by mixing to create a toner.

TABLE 3

| Component | Compounded amount |
|---|---|
| Polyester resin A | 93 parts |
| Copper phthalocyanine pigment (C.I. Pigment Blue 15:3) | 4 parts |
| Paraffin wax (Melting point 76° C.) | 3 parts |

Test example 1

Low Temperature Fixing Property and Anti-Offset Property

This toner was developed using the commercial laser beam printer, and the non-fixed image was created. Using the external fixing device (fixing speed: 250 min/second) in which the commercial copying machine having the heat-pressure roller structure was improved so as to enable the resultant non-fixed image to be fixed at the outer side of the device, the non-fixed image was fixed while raising the temperature of a fixing roll from 100° C. to 240° C. by 5° C., and the fixing test was performed.

The image acquired in each fixing temperature was rubbed with an eraser [MONO (trademark); TOMBOW Pencil], the temperature of the fixing roll which the value calculated by [image density after rubbing/image density before rubbing]× 100 exceeds 85% at the beginning is named as a minimum fixing temperature, and low temperature fixing property was evaluated in accordance with the following criteria. Hot offset generating temperature was also confirmed simultaneously and anti-offset property was evaluated in accordance with the following criteria. The results are shown in Table 4.

[Evaluation of Low Temperature Fixing Property]

The following criteria were used. ⊚: minimum fixing temperature is 150° C. or less, ○: minimum fixing temperature exceeds 150° C. and is 180° C. or less, and X: minimum fixing temperature exceeds 180° C.

[Evaluation of Anti-Offset Property]

The following criteria were used. ⊚: hot offset generating temperature is not less than 240° C., ○: hot offset generating temperature is not less than 190° C. and less than 220° C., and X: hot offset generating temperature is less than 180° C.

Test example 2

Anti-Blocking Property Test 40 g of a toner was tightly closed in a 200 mL glass container, and it was left in a temperature controlled bath at 50° C. for 24 hours. After leaving, it was observed whether an agglomeration of a toner was generated or not and the anti-blocking property was evaluated in accordance with the following evaluation criteria. A result is combined with and shown in Table 4.
[Evaluation of Anti-Blocking Property]
The following criteria were used. ◎: no agglomeration of toner was recognized, ○: agglomeration of toner was slightly recognized, X: agglomeration of toner was recognized clearly.

Examples 7 to 10 and Comparative Examples 7 to 12

In the same manner as in Example 6, the toners of Examples 7 to 10 were obtained using the polyester resins B, C, D, and E of Examples 2 to 5, and the low temperature fixing property, anti-offset property, anti-blocking property were evaluated according to the test example 1 and the test example 2. The results are combined with and shown in Table 4.

TABLE 4

| Examples and Comparative examples | Polyester resin | Low temperature fixing property | Anti-offset property | Anti-blocking property |
|---|---|---|---|---|
| Example 6 | A | ◎ | ○ | ○ |
| Example 7 | B | ○ | ◎ | ◎ |
| Example 8 | C | ◎ | ◎ | ◎ |
| Example 9 | D | ◎ | ○ | ○ |
| Example 10 | E | ○ | ◎ | ◎ |
| Comparative example 7 | F | X | ◎ | ◎ |
| Comparative example 8 | G | ◎ | X | X |
| Comparative example 9 | H | ◎ | X | X |
| Comparative example 10 | I | X | ◎ | ◎ |
| Comparative example 11 | J | X | ◎ | ○ |
| Comparative example 12 | K | X | ○ | ○ |

As explained in full detail above, in the toner of the invention for developing an electrostatic charge image, the polyester resin is used in which as a binder resin of a toner, an acid component comprises aromatic dicarboxylic acid and disproportionated rosin, and an alcohol component comprises tri- or more-valent polyhydric alcohol, the toner having the same properties as, or better properties than, that of the conventional toners, such as a low temperature fixing property, anti-blocking property, and anti-offset property can be obtained.

Thus, the classified product of the toner has an improved storage stability, does not suffer reduction in fluidity of the toner upon developing and does not cause blocking thereof, and can form a good developed image over a long period of time from the start of development. Further, no offset phenomenon is observed upon fixing a toner image, which is formed by using the toner of the invention for developing an electrostatic charge image, by using a fixing roller or a fixing belt, and the toner shows a good low temperature fixing property. Therefore, it becomes possible to reduce the size of the apparatus and save energy.

INDUSTRIAL APPLICABILITY

In the polyester resin, the excellent performance relating to the toner properties can be exerted, so, it is useful for the use which maximizes the performance of an aromatic dicarboxylic acid and disproportionated rosin as an acid component, and tri- or more-valent polyhydric alcohol as an alcohol component.

The invention claimed is:
1. A polyester resin for toner comprising an acid component and an alcohol component, wherein the acid component comprises (1) an aromatic dicarboxylic acid and (2) a disproportionated rosin, and the alcohol component comprises (3) a tri- or more-valent polyhydric alcohol, the molar ratio (3)/(1) of the alcohol component (3) and the acid component (1) being from 1.05 to 1.65 and the molar ratio (2)/(1) of the acid components (2) and (1) being from 0.80 to 2.20.
2. A polyester resin for toner according to claim 1, wherein the aromatic dicarboxylic acid component uses at least one component selected from the group consisting of terephthalic acid and isophthalic acid.
3. A polyester resin for toner according to claim 1, wherein the tri- or more-valent polyhydric alcohol component uses at least one component selected from the group consisting of trimethylolethane, trimethylolpropane, glycerin and pentaerythritol.
4. A polyester resin for toner according to claim 1, wherein the resin comprises further an aliphatic polycarboxylic acid as an acid component.
5. A polyester resin for toner according to claim 1, wherein the resin comprises further at least one component selected from the group consisting of aliphatic diol and etherified diphenol as an alcohol component.
6. A polyester resin for toner according to claim 1, wherein the resin has an acid value of from 5 to 50 mgKOH/g, a softening temperature of from 105 to 150° C., and a glass transition temperature of from 45 to 80° C.
7. A toner for developing an electrostatic charge image, comprising a polyester resin for toner according to claim 1.

* * * * *